(12) United States Patent
Beele (10) Patent No.: US 8,764,022 B2
(45) Date of Patent: Jul. 1, 2014

(54) SYSTEM AND A METHOD FOR STOPPING IN AN OPENING A FLOW OF A FLUID

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 0 days.

(21) Appl. No.: 13/876,755

(22) PCT Filed: Sep. 26, 2011

(86) PCT No.: PCT/EP2011/066654
§ 371 (c)(1),
(2), (4) Date: Jun. 5, 2013

(87) PCT Pub. No.: WO2012/041803
PCT Pub. Date: Apr. 5, 2012

(65) Prior Publication Data
US 2013/0248084 A1    Sep. 26, 2013

(30) Foreign Application Priority Data
Sep. 30, 2010   (EP) .................................... 10012088

(51) Int. Cl.
*F16L 55/10*    (2006.01)

(52) U.S. Cl.
USPC ............. 277/627; 156/94; 277/314; 277/602; 427/402; 427/208.8

(58) Field of Classification Search
CPC ....................................................... F16L 55/10
USPC ............. 277/314, 602, 627; 156/94; 427/402, 427/208.8
See application file for complete search history.

(56) References Cited

U.S. PATENT DOCUMENTS

2010/0164176 A1 *   7/2010   Beele ............................ 277/314

* cited by examiner

*Primary Examiner* — Jeff Aftergut
*Assistant Examiner* — Jaeyun Lee
(74) *Attorney, Agent, or Firm* — Wolf, Greenfield & Sacks, P.C.

(57) ABSTRACT

A system for stopping in an opening a flow of a fluid, wherein the system comprises: a kneadable silicon based polymer for fitting in and/or onto the opening so as to block any flow of the fluid through the opening, wherein the silicon based polymer comprises fillers so that the density of the silicon based polymer is higher as compared to the density of the silicon based polymer that does not comprise these fillers, and a silicon based sealant for applying against a dried form of the silicon based polymer, wherein the silicon based sealant is vulcanizable under exposure to humidity.

16 Claims, 11 Drawing Sheets

SYSTEM AND A METHOD FOR STOPPING IN AN OPENING A FLOW OF A FLUID

The invention relates to a system for stopping in an opening a flow of a fluid. The invention also relates to a method for stopping in an opening a flow of a fluid.

BACKGROUND OF THE INVENTION

Many constructions contain positions where a construction element is on the one hand designed such that cables and/or pipes can pass through the construction element to extend from one side of the construction element to another side of the construction element. The very same construction element may also be a divider for one or more fluids, i.e. aimed at keeping one or more fluids at one side of the construction element. Such construction elements have in a sense conflicting requirements. Sealing systems form an answer to these challenging circumstances and demands. When such sealing systems fail, i.e. for instance water leaks through the sealing system, it is desirable that a repair system is available, so that the alternative of completely replacing the sealing system, requiring more drastic interventions in the local circumstances, can be avoided.

In the art, use is made of so-called water stops. These are shaped bodies widely used to prevent leakage of water by filling gap spaces, interstices, cracks, fissures and the like responsible for leakage of water therethrough, for example, in the joints of precast concrete bodies, construction joints of mortar or concrete works, joints in water-supply pipes and the like in civil engineering works and in building constructions in general.

So-called water-swellable water stops are reported to work by virtue of the volume increase of the water stop by swelling in water. Those water stops may be of the complete-vulcanization type. The problem in the use of water stops of this type is in the relatively low working efficiency therewith due to the requirement of a considerably high fastening pressure to completely fill up the gaps between irregular or rugged surfaces or at a corner portion of concrete bodies because the water stop material usually has a high tensile strength and high compressive elastic resilience. Known water stops also include those formulated with a readily deformable water-resistant material, such as rubbers, plastics, bitumens and the like, as a base. The water stops formulated with these base materials, however, are also not always quite satisfactory due to their poor compliance with the changes in the dimensions of the gaps filled therewith, possibly as a result of the increase in the elastic resilience or appearance of the phenomenon of creeping after a long time of service so as to cause a loss in the leakage-preventing power. Water stops of the water-swellable vulcanized-rubber type still have a problem to be solved.

On the other hand, water stops formulated with an adhesive butyl rubber are under prevailing use as a water stop for gap-filling applications despite the defects due to the relatively large permanent compression set and poor restorability thereof. Water-swellable adhesive water stops formulated with a butyl rubber have been proposed as an improved modification of the above but they, being of the unvulcanized-rubber type, have a defect in the basic properties that the water stop is susceptible to collapsing under the swelling pressure which the water stop cannot withstand when swollen with water.

U.S. Pat. No. 5,290,844, which proposes the use of a rubbery matrix which is partially crosslinked by using an adequate amount of the vulcanizing agent to enhance moldability by improving plastic deformability. However, this water stop should be swellable so that upon hydrolysis it will expand to cover the surface area of the gap in which it is placed. In this manner, the water stop can then adequately perform its intended function of acting as a water seal to prevent water penetration into the gap.

In view of the need to have a water stop which is initially well-moldable and deformable to fill the gap or the opening through which the fluid flows, to be swellable on absorbing the fluid, so as to exclude remaining gaps and to have appropriate mechanical properties to sustain some pressure of the fluid, it is desirable to provide an alternative and in many aspects improved system for stopping in an opening a flow of a fluid.

SUMMARY OF THE INVENTION

The present invention accordingly seems to provide an alternative and in many aspects improved system for stopping in an opening a flow of a fluid. This object is achieved by providing a system which comprises:

a kneadable silicon based polymer for fitting in and/or onto the opening so as to block any flow of the fluid through the opening, wherein the silicon based polymer comprises fillers so that the density of the silicon based polymer is higher as compared to the density of the silicon based polymer that does not comprise these fillers, the silicon based polymer being dryable by heating; and a silicon based sealant for applying against a dried form of the silicon based polymer, wherein the silicon based sealant is vulcanizable under exposure to humidity, and is further such that after vulcanization the sealant has a hardness within a range of 45-60° shore A.

According to the invention, two different materials are provided, wherein the first material comprises the kneadable silicon based polymer which can be kneaded and fittingly placed in and/or onto the opening, even though a flow of fluid is running through the opening. The silicon based polymer has a relatively high density due to the fillers incorporated therein, so that the material has some "body", to withstand the flow of the fluid once it has indeed fittingly been placed in and/or onto the opening. It is for instance possible to form the kneadable silicon based polymer into a kind of plug. This kind of plug can then be pushed into the opening so as to at least partially block the flow of fluid. Any remaining gaps through which the fluid may flow, can be filled up with the silicon based polymer by spreading this in and/or over these gaps. The silicon based polymer, acting as a water stop, can then be dried at a side which is facing away from the fluid. As the silicon based polymer is dryable by heating, such drying can take place by the application of a fan and hot air, so that the drying can take place in a minimum of time.

As the system according to the invention further provides a silicon based sealant for applying against a dried form of the silicon based polymer, and the silicon based sealant is vulcanizable under exposure to humidity, it is possible to then apply against the dried side of the silicon based polymer, the silicon based sealant, which then rapidly vulcanizes and provides the necessary mechanical properties, such as a hardness within a range of 45-60° shore A. Further advantages of the use of silicon are its water-repellency, its long lifetime, and its substantially non-aging character and nature.

The invention further provides a method for stopping in an opening a flow of a fluid, wherein the method comprises:

providing a kneadable silicon based polymer for fitting in and/or onto the opening so as to block any flow of the fluid through the opening, wherein the silicon based polymer comprises fillers so that the density of the silicon based polymer is higher as compared to the density of the silicon based polymer that does not comprise these fillers, the silicon based polymer being dryable by heating;

providing a silicon based sealant for applying against a dried form of the kneadable silicon based polymer, wherein the silicon based sealant is vulcanizable under exposure to humidity, and is further such that after vulcanization the sealant has a hardness within a range of 45-60° shore A;

fitting the silicon based polymer in the opening so as to block any flow of the fluid through the opening;

drying the silicon based polymer at a side which is facing away from the fluid;

applying against the dried side of silicon based polymer the silicon based sealant.

This provides a relatively fast and very reliable method for stopping in an opening a flow of fluid.

The invention is further described with reference to the drawing, which shows in.

Figure 1:
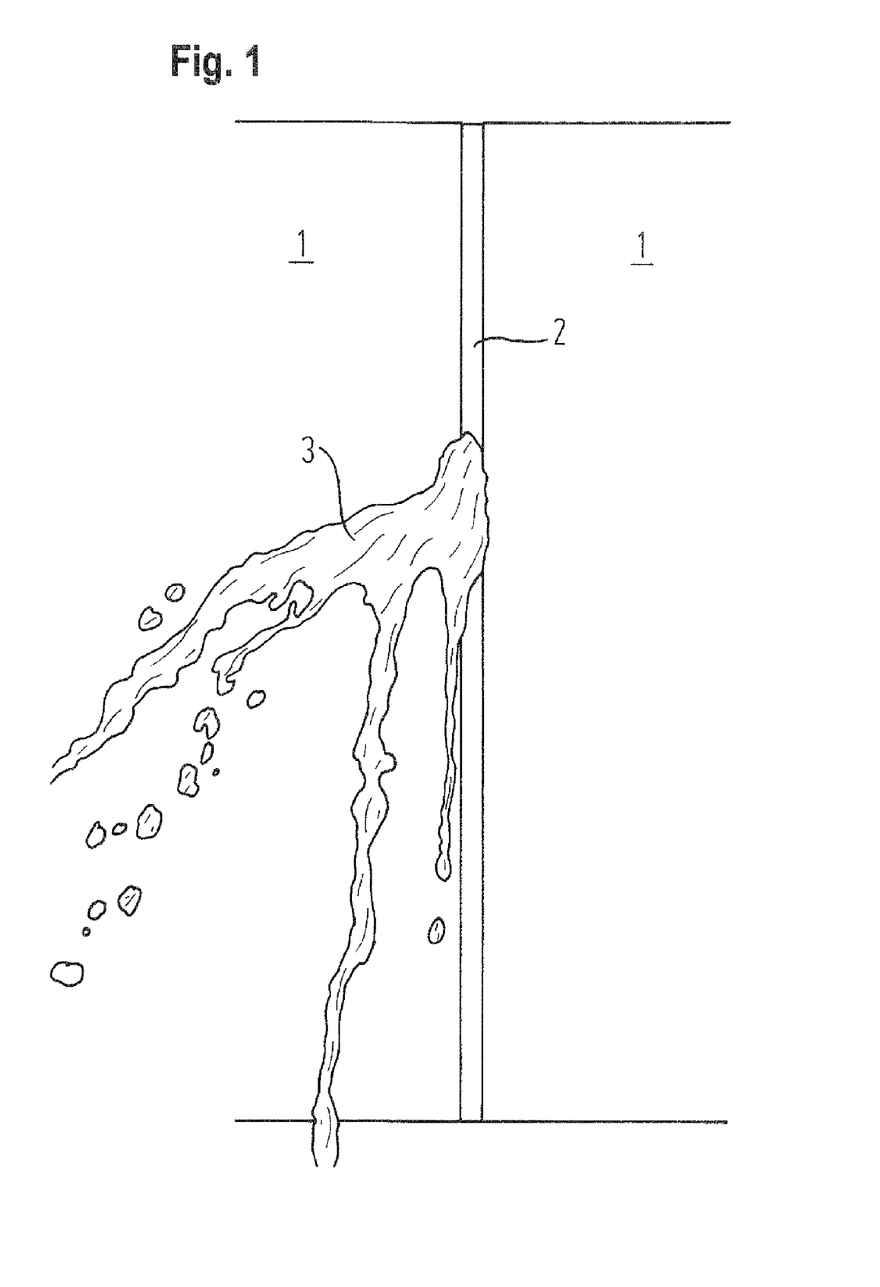
FIG. 1 shows an opening through which a fluid flows.

In the drawing, like parts or features have like references. FIG. 1 shows a wall 1 with a joint 2 having an opening (not shown) through which a fluid 3 flows. In this case, the fluid 3 concerns water 3. Joint 2 could be formed by a previously applied sealing system, a weld, or another form for making a joint between two parts 1 of a wall. The opening (not shown) through which the fluid i.e. water 3, flows, can actually be in any construction element that is meant to separate the water 3 from its surroundings. In other words, the opening can also be in a tank, or any other type of container, sealing transit system having cables and pipes extending therethrough, etc.

Figure 2:
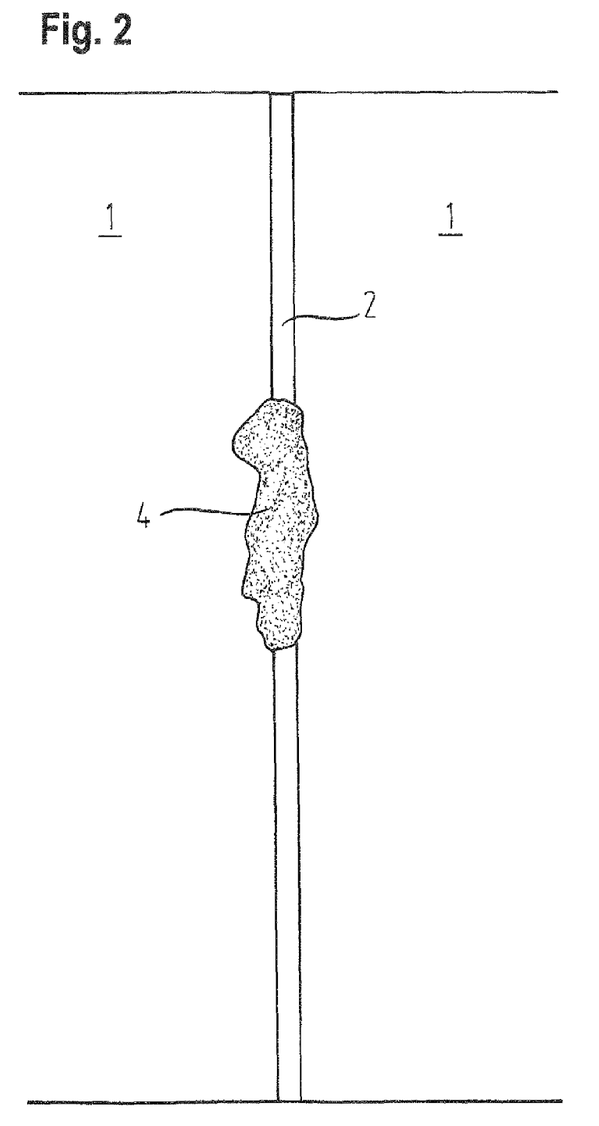
FIG. 2 shows partly a first embodiment in accordance with the invention.

FIG. 2 shows a kneadable silicon based polymer 4 applied such that it fits in or onto the opening, and as such blocks a flow of the fluid through the opening. The silicon based polymer comprises fillers so that the density of the silicon based polymer is higher as compared to the density of the silicon based polymer that does not comprise these fillers. The kneadable silicon based polymer 4 may initially be formed into a kind of plug to facilitate pressing this plug into the openings, so that the plug at least partially blocks the flow of the fluid (water).

Figure 3:
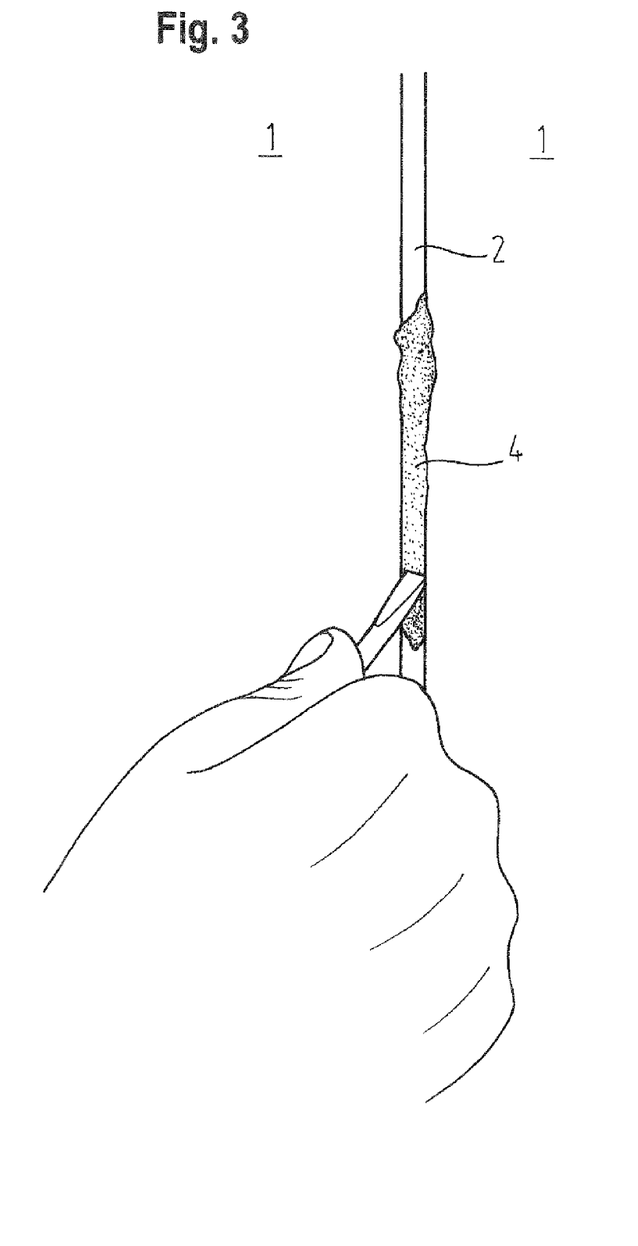
FIG. 3 shows another embodiment in accordance with the invention.

FIG. 3 shows how any (potential) remaining gaps for flow of the fluid may be blocked by spreading the silicon based polymer 4 in and/or over such gaps, for instance, using the end of a screw driver.

The silicon based polymer 4 can be dried by applying heat.

Figure 4:
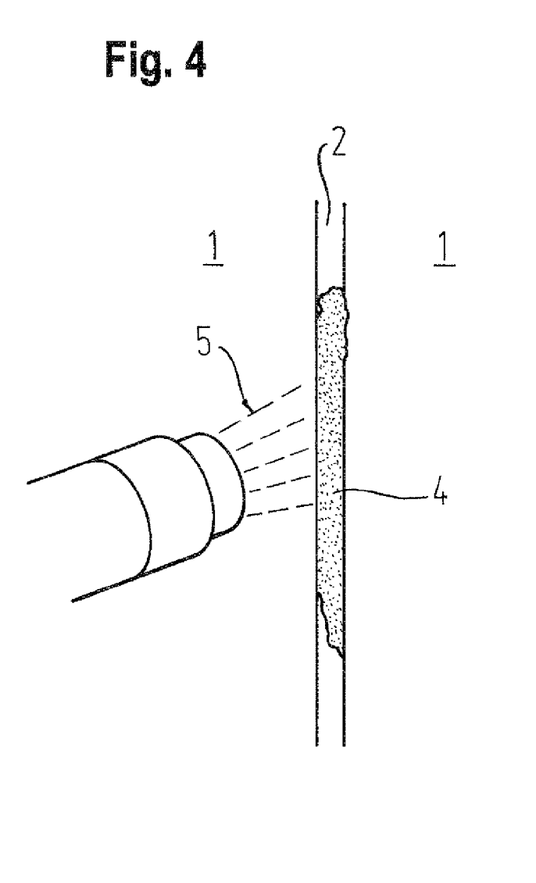
FIG. 4 shows another embodiment in accordance with the invention.

FIG. 4 shows the use of hot air 5 for drying the silicon based polymer as fitted in and/or onto the opening.

Figure 5:
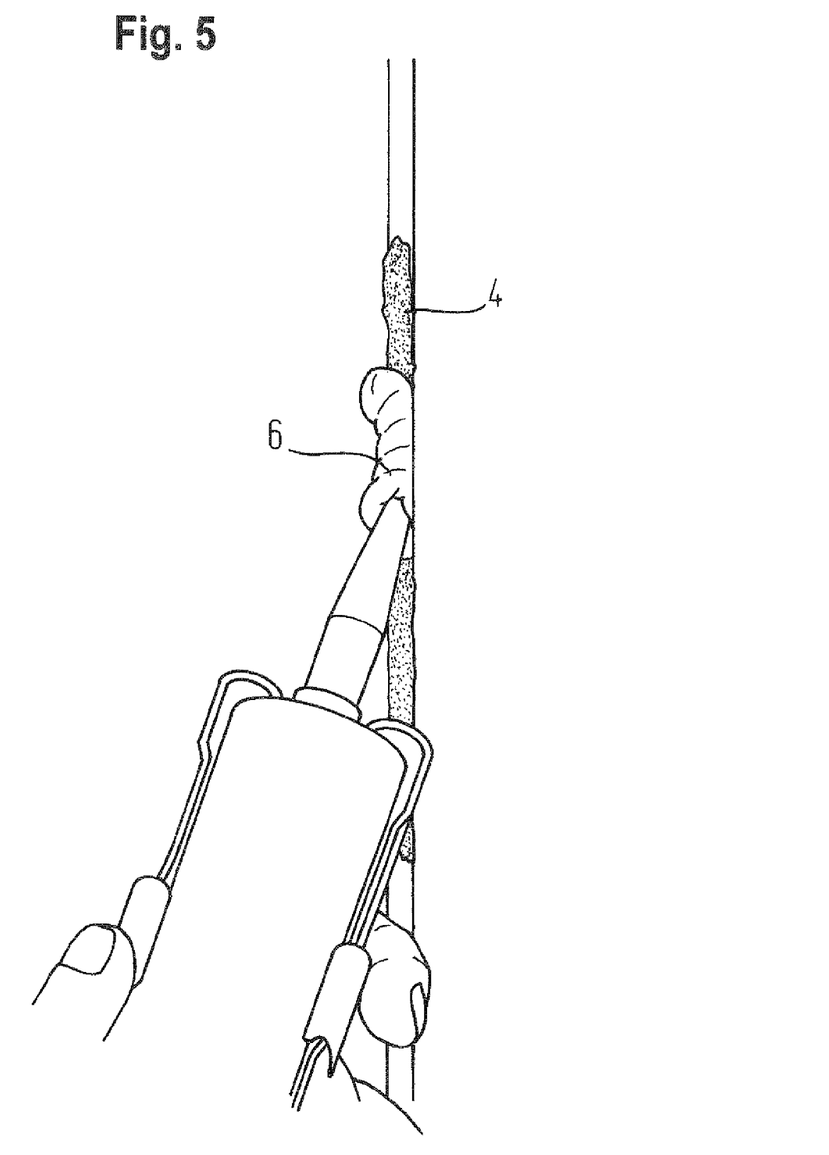
FIG. 5 shows another embodiment in accordance with the invention.

FIG. 5 shows a silicon based sealant 6 being applied against the dried form of the silicon based polymer 4. Silicon based sealant 6 is vulcanizable under exposure to humidity, and is further such that vulcanization sealant 6 has a hardness within the range of 45-60° shore A.

The silicon based sealant can be a commercially available sealant, such as the one sold by Beele Engineering B.V. under the name Nofirno. The kneadable silicon based polymer 4 is itself based on the non-vulcanized sealant. The silicon based polymer 4 comprises, however, more fillers than the non-vulcanized sealant so that the density and the viscosity of the silicon based polymer is higher than the density and the viscosity of the sealant. Also, the viscosity is much higher as a result of these extra fillers. The sealant itself is more extensively described in European Patent Application No. 10 154 813.9. The sealant 6 is of a type which is preferably shape-retaining and size-retaining under exposure to heat. The sealant is preferably non-ignitable at a temperature of 400° C. The sealant has preferably an oxygen index of 45% or higher.

As indicated above, the system comprising the kneadable silicon based polymer 4 and the silicon based sealant 6 is suitable for stopping in an opening a flow of liquid. The liquid may be water. In fact, as silicon is water repellent, the system is particularly suitable for stopping in an opening a flow of water.

Preferably the kneadable silicon based polymer is non-vulkanizable. Furthermore, it is preferable that the kneadable silicon based polymer 4 is non-swellable under exposure to water. Applying a system in accordance with the invention, for instance in the way as shown in FIGS. 1-5, has resulted in a complete and permanent sealing of the leakage which originally produced the flow of water 3 in FIG. 1.

Figure 6:
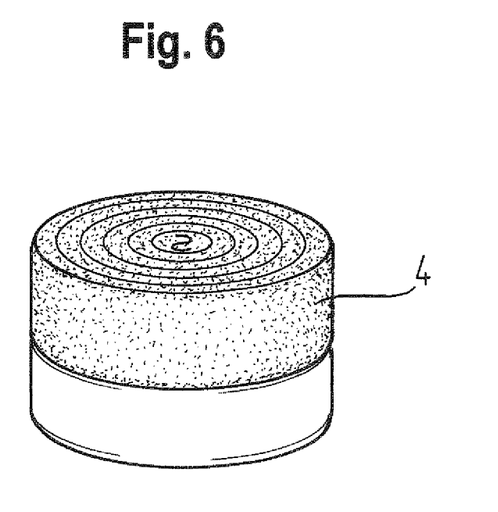
FIG. 6 shows another embodiment in accordance with the invention.

FIG. 6 shows two discs of originally extruded and then rolled up strips of kneadable silicon based polymer as described above.

Figure 7:
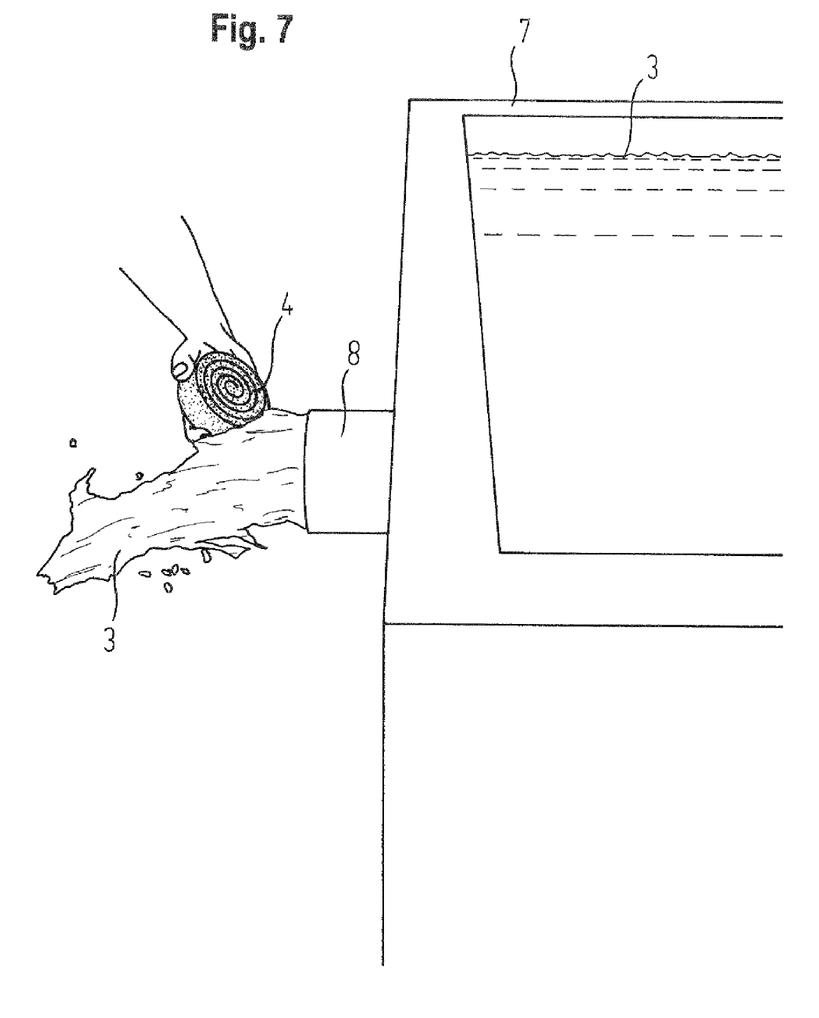
FIG. 7 shows another embodiment in accordance with the invention.

FIG. 7 shows a water-filled tank 7 out of which through a conduit 8 water 3 flows. In this context, it is pointed out that the opening referred to above, can also be a conduit. The kneadable silicon based polymer 4 for fitting in and/or onto the opening, i.e. the opening of the conduit, is held close to the opening ready for pushing into the opening so as to block (at least partially) the flow of water through the opening. As shown, the kneadable silicon based polymer has more or less the form of a plug.

Figure 8:
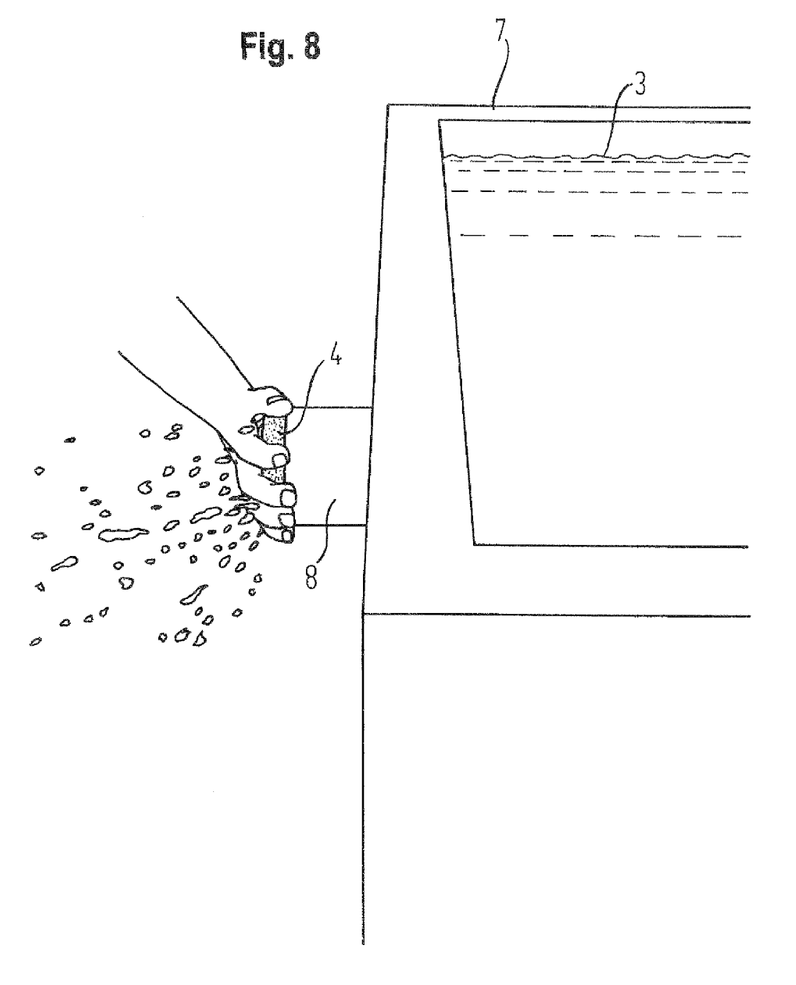
FIG. 8 shows another embodiment in accordance with the invention.

FIG. 8 shows the pushing of the silicon based polymer 4, in plug form, into the conduit so as to significantly block the flow of water out of the conduit.

Figure 9:
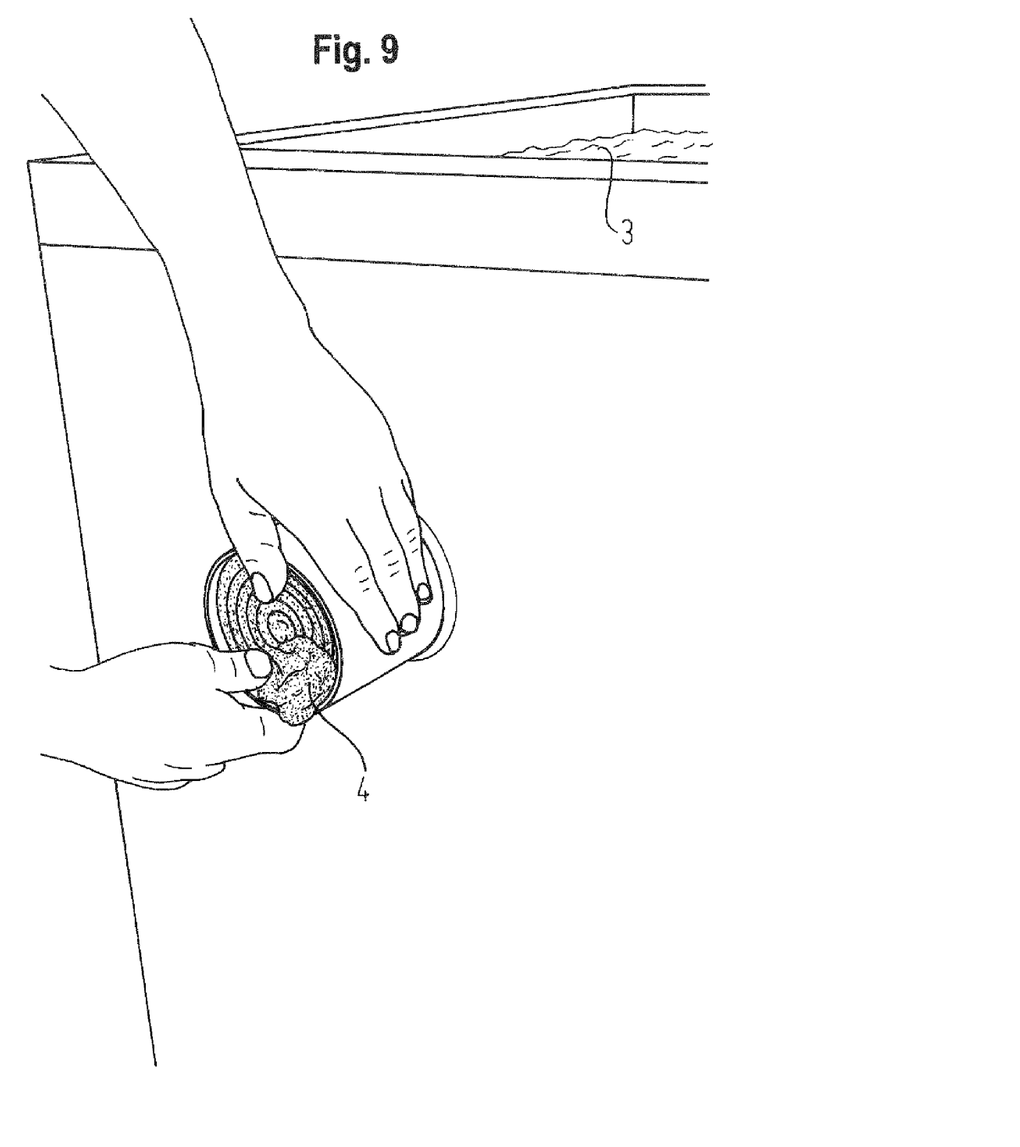
FIG. 9 shows another embodiment in accordance with the invention.

FIG. 9 shows that by hand, any remaining gaps for the flow of water can be blocked by spreading the silicon based polymer 4 in and/or over these gaps.

Figure 10:
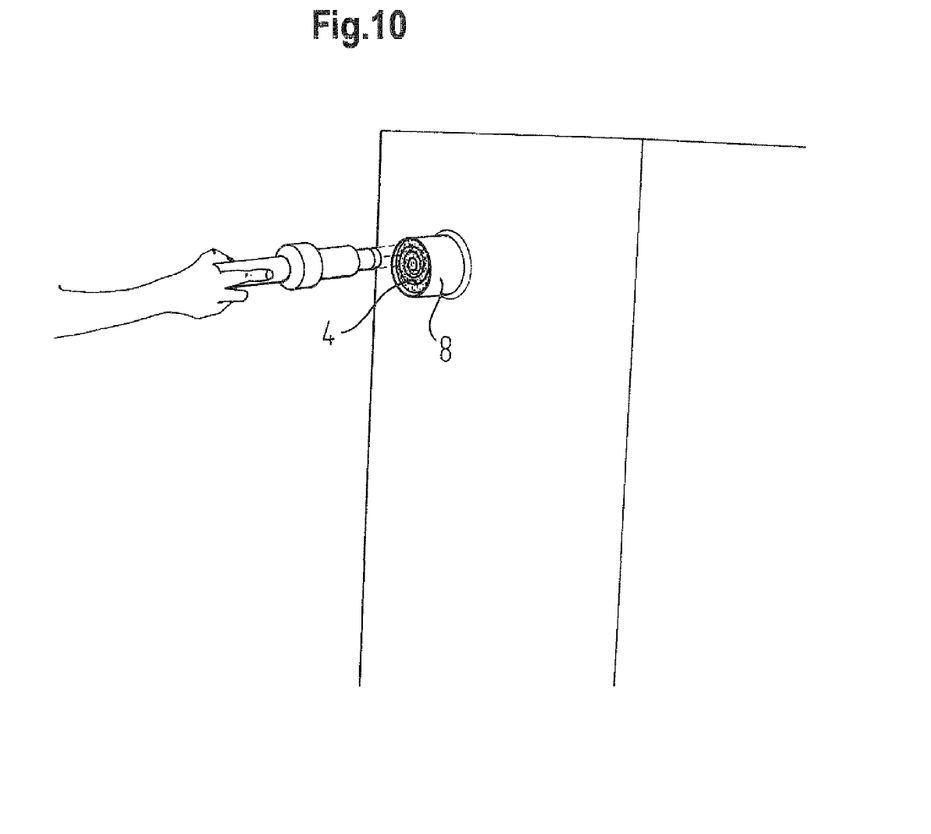
FIG. 10 shows another embodiment in accordance with the invention.

FIG. 10 shows how the silicon based polymer 4 as provided into the opening to block the flow of water, can be dried at a side which is facing away from the water. In this case, hot air 5 is blown against that side of the silicon based polymer 4.

Figure 11:
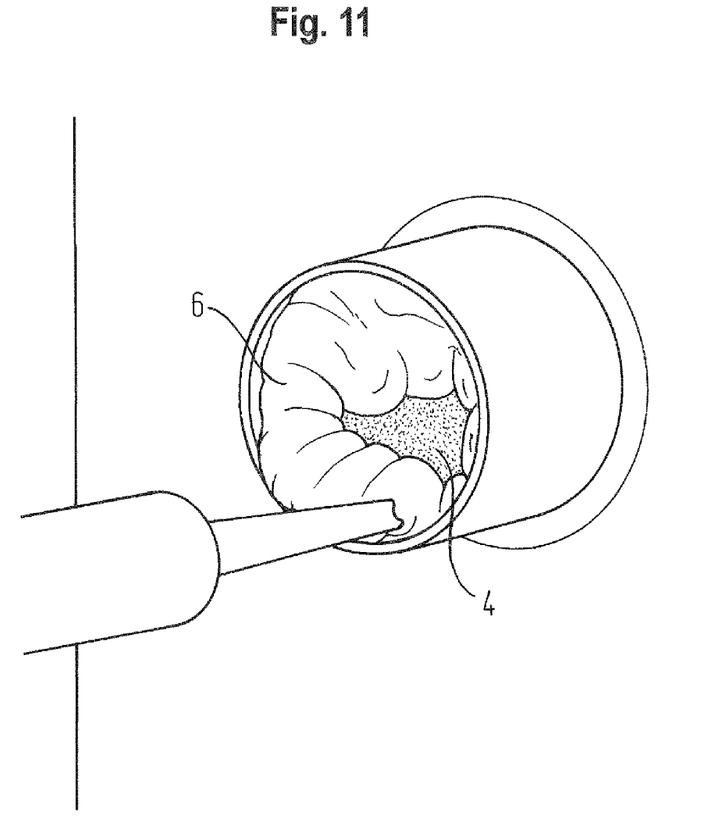
FIG. 11 shows another embodiment in accordance with the invention.

FIG. 11 shows the application of the silicon based sealant 6 against the dried side of the silicon based polymer 4. The silicon based polymer 4, in dried form, provides a support for the application of the silicon based sealant 6. Preferably, the sealant 6 is applied such that a sealant layer having a thickness between 10 and 30 mm is achieved.

It is envisaged that the system as described, and the method as described, can equally be applied in a conduit through which for instance cables or pipes extend. It is further envisaged that use is made of a so-called extender frame, to provide an opening having an inner wall, so that the system for stopping a flow of fluid can indeed by applied in an opening.

It has turned out that this system and method, is capable of stopping a flow of fluid, particularly a flow of water, in a relatively easy way and in a permanent way. In other words, there is not aftercare or further maintenance needed to ensure that the flow of fluid is indeed stopped. The sealant 6, being vulcanizable under exposure to humidity, obtains finally a hardness within the range of 45-60° shore A, therewith providing sufficient mechanical strength to sustain a relatively high pressure of water, at least the pressure corresponding to a water column having a height of 1 meter, and depending on the geometry of the opening, thicknesses of layers of silicon based sealant etc., most likely even much higher.

The fillers added to the silicon based polymer to enhance the density and the viscosity, can easily be selected by a person skilled in the art. As indicated above, kneadable silicon based polymer can essentially be a non-vulcanizable variant of the silicon based sealant (which is commercially available). The same fillers as used in the sealant, can also be applied in the silicon based polymer. The relative amounts can be worked out on the basis of routine experiments, which can easily be carried out by a person skilled in the art.

The invention claimed is:

1. A system for stopping in an opening a flow of a fluid, wherein the system comprises:
    a kneadable silicon based polymer for fitting in and/or onto the opening so as to block any flow of the fluid through the opening, wherein the silicon based polymer comprises fillers so that the density of the silicon based polymer is higher as compared to the density of the silicon based polymer that does not comprise these fillers, the silicon based polymer being dryable by heating; and
    a silicon based sealant for applying against a dried form of the silicon based polymer, wherein the silicon based sealant is vulcanizable under exposure to humidity, and is further such that after vulcanization the sealant has a hardness within a range of 45-60° Shore A.

2. A system according to claim 1, wherein the sealant is of a type which is essentially shape-retaining and size-retaining under exposure to heat.

3. A system according to claim 1, wherein the sealant is non-ignitable at a temperature of 400° C.

4. A system according to claim 1, wherein the sealant has an oxygen index of 45% or higher.

5. A system according to claim 1, wherein the kneadable silicon based polymer is essentially the non-vulcanized sealant, wherein the silicon based polymer comprises more fillers than the non-vulcanized sealant so that the density and the viscosity of the silicon based polymer is higher than the density and the viscosity of the sealant.

6. A system according to claim 1, wherein the system is for stopping in an opening a flow of liquid.

7. A system according to claim 6, wherein the system is for stopping in an opening a flow of liquid.

8. A system according to claim 1, wherein the kneadable silicon based polymer is non-vulcanizable.

9. A system according to claim 1, wherein the kneadable silicon based polymer is non-swellable under exposure to water.

10. A method for stopping in an opening a flow of a fluid, wherein the method comprises:
    providing a kneadable silicon based polymer for fitting in and/or onto the opening so as to block any flow of the fluid through the opening, wherein the silicon based polymer comprises fillers so that the density of the silicon based polymer is higher as compared to the density of the silicon based polymer that does not comprise these fillers, the silicon based polymer being dryable by heating
    providing a silicon based sealant for applying against a dried form of the kneadable silicon based polymer, wherein the silicon based sealant is vulcanizable under exposure to humidity, and is further such that after vulcanization the sealant has a hardness within a range of 45-60° Shore A
    fitting the silicon based polymer in the opening so as to block any flow of the fluid through the opening;
    drying the silicon based polymer at a side which is facing away from the fluid;
    applying against the dried side of silicon based polymer the silicon based sealant.

11. A method according to claim 10, wherein the fluid is a liquid.

12. A method according to claim 11, wherein the liquid is water.

13. A method according to claim 10, wherein the sealant is applied such that a sealant layer having a thickness between 10 and 30 mm is achieved.

14. A method according to claim 10, wherein the method comprises forming the kneadable silicon based polymer into a plug.

15. A method according to claim 10, wherein the method comprises pushing the plug into the opening so as to at least partially block the flow of the fluid.

16. A method according to claim 10, wherein the method comprises spreading the silicon based polymer in and/or over the gap so as to block any remaining gaps for flow of the fluid.

\* \* \* \* \*